United States Patent [19]

Klein

[11] Patent Number: 5,318,076
[45] Date of Patent: Jun. 7, 1994

[54] PROTECTIVE REFRACTORY LOCKING MECHANISM
[75] Inventor: Thomas E. Klein, Library, Pa.
[73] Assignee: Bloom Engineering Company, Inc., Pittsburgh, Pa.
[21] Appl. No.: 975,874
[22] Filed: Nov. 13, 1992
[51] Int. Cl.$^5$ ............................................. F16L 9/14
[52] U.S. Cl. .................................... 138/147; 138/149; 432/234
[58] Field of Search ............... 138/147, 149, 156, 157, 138/158, 161, 162, 165, 166, 168; 432/233, 234

[56] References Cited

U.S. PATENT DOCUMENTS

| | | | |
|---|---|---|---|
| 1,028,829 | 6/1912 | Reuterdahl | 138/162 |
| 1,028,830 | 6/1912 | Reuterdahl | 138/162 |
| 1,149,726 | 8/1915 | Crotsly et al. | 138/158 |
| 3,030,250 | 4/1962 | Losse | 154/44 |
| 3,208,478 | 9/1965 | Baines | 138/166 |
| 3,347,276 | 10/1967 | Dunn | 138/166 |
| 3,360,894 | 1/1968 | Sharman et al. | 138/166 |
| 3,781,167 | 12/1973 | Ahonen | 432/234 |
| 3,858,282 | 1/1975 | Plummer | 138/168 |
| 4,071,311 | 1/1978 | Errington | 432/234 |
| 4,140,483 | 2/1979 | Errington | 432/234 |
| 4,170,451 | 10/1979 | Luff | 138/147 |
| 4,182,609 | 1/1980 | Hovis et al. | 432/234 |
| 4,288,219 | 9/1981 | Gana et al. | 138/147 |
| 4,429,721 | 2/1984 | Davis | 138/149 |
| 4,442,154 | 4/1984 | Förtsch et al. | 138/168 |
| 4,505,303 | 3/1985 | Revere et al. | 138/149 |
| 4,539,055 | 9/1985 | Orcutt | 156/92 |
| 4,591,340 | 5/1986 | Magera | 432/234 |
| 4,601,659 | 7/1986 | Webster et al. | 432/234 |
| 4,609,347 | 9/1986 | Yamashita et al. | 432/234 |
| 4,629,422 | 12/1986 | Bricmont | 432/234 |
| 4,647,713 | 3/1987 | de Nijs et al. | 138/166 |
| 4,687,027 | 8/1987 | Magera | 138/149 |
| 4,689,009 | 8/1987 | Heuss | 432/234 |
| 4,732,796 | 3/1988 | Schatschneider | 428/36 |
| 4,772,507 | 9/1988 | Leo, Jr. et al. | 428/218 |
| 4,776,790 | 10/1988 | Woodruff | 432/233 |
| 4,830,061 | 5/1989 | Karakawa | 138/168 |
| 4,838,318 | 6/1989 | Karakawa | 138/166 |
| 4,838,785 | 6/1989 | Campbell, Jr. | 432/121 |
| 4,840,201 | 6/1989 | Botsolas | 138/178 |
| 4,850,397 | 7/1989 | Grenier | 138/149 |
| 4,852,831 | 8/1989 | Sandstrom | 248/58 |
| 4,906,525 | 3/1990 | Seguchi et al. | 428/469 |
| 5,004,018 | 4/1991 | Bainbridge | 138/149 |
| 5,020,481 | 6/1991 | Nelson | 122/494 |
| 5,031,665 | 7/1991 | Chen et al. | 138/149 |
| 5,056,564 | 10/1991 | Roth | 138/149 |
| 5,078,182 | 1/1992 | Kraft | 138/147 |
| 5,112,661 | 5/1992 | Pendergraft et al. | 428/36.91 |
| 5,145,218 | 9/1992 | Worley et al. | 138/109 |
| 5,181,319 | 1/1993 | Campbell, Jr. | 138/149 |

FOREIGN PATENT DOCUMENTS 0961188  6/1964  United Kingdom ............... 138/168

OTHER PUBLICATIONS

Bloom Engineering Company, Inc.; Drawing No. SKB-8684-B (1 page); Dec. 12, 1990; entitled "2" Thick Ka-Weld Assembly for Therm-a-Rail Crossovers and Risers; Strap Orientation for Manufacturing.

Primary Examiner—Timothy F. Simone
Assistant Examiner—James F. Hook
Attorney, Agent, or Firm—Webb, Ziesenheim, Bruening, Logsdon, Orkin & Hanson

[57] ABSTRACT

A device for locking refractory insulation members on support elements in a heat treating furnace, boiler or other piping has a first strap end with a ramp and a second strap end with a raised bearing tab. The ramp engages the bearing tab with an interference-fit to capture the first strap end on the second strap end. The first embodiment of the invention includes a hook insertable in a window. The hook has a deflectable ramp with a bearing edge which engages a lock surface on the raised bearing tab to lock opposing strap ends to one another. The second embodiment of the invention includes an angled edge on the first strap end which engages the raised bearing tab on the second strap end. The first and second strap ends have opposing slots. The first strap end includes a notched back which, when the opposing slots are fully interengaged, receives the bearing tab to capture the first strap end on the second strap end. In both embodiments, the first strap end is positively locked on the second strap end to prevent the strap ends from working free from one another. No welding or bending is required to lock the strap ends to one another.

12 Claims, 4 Drawing Sheets

PROTECTIVE REFRACTORY LOCKING MECHANISM

BACKGROUND OF THE INVENTION

1. Field of the Invention

This invention relates to refractory insulation for support elements in heat treating furnaces and, more particularly, to means for securing insulation on the support elements.

2. Description of the Prior Art

Heat treating furnaces, for example walking beam furnaces or roller hearth furnaces, typically employ support elements, such as water cooled pipes having skid rails or the like, for supporting a work piece as it is conveyed through the furnace. To minimize heat loss from the furnace into the cooling water, the pipes are provided with jackets of refractory insulation. The jackets are typically formed in semi-cylindrical pre-cast segments, or similar configurations, which are joined to one another to encircle the support elements. To facilitate interlocking the segments to one another, metallic straps are integrally cast with the refractory material, and the strap ends have means for interlocking one to another, as shown in U.S. Pat. No. 3,781,167.

Problems heretofore experienced with refractory insulation include the following: The useful life of refractory insulation jackets is relatively short, so the heat treating furnace must regularly be shut down for work personnel to enter the furnace and repair or replace insulation. The more complicated the attachment, the more time required to loosen old insulation and install replacements. Additionally, the shocks and stresses incident to movement of the work piece through the furnace causes refractory insulation segments which have no locking mechanism to work free from one another. Loose insulation thus may fall to the furnace floor, leaving the water cooled pipes directly exposed to the furnace atmosphere.

U.S. Pat. No. 3,781,167 discloses no-weld refractory coverings for water cooled pipes wherein metallic straps are anchored and pre-cast into semi-cylindrical insulation segments. The straps have opposing slots on their ends which are intermeshed to hold corresponding insulation segments to one another around a water cooled pipe. A second embodiment of the straps includes a first strap end having peripheral slots and a second strap end having mating tabs which are received in the slots to interlock opposing straps. The first embodiment of the straps is subject to loosening and fall-off of individual segments since there is no means for positively locking the opposing slots to one another. The second embodiment appears to require manufacturing within very low tolerances. If the tabs are even slightly larger than the opposing slots, the opposing strap ends will not interlock properly, thus unduly increasing installation time and labor. It also appears that the second embodiment would be difficult to disengage for repair or replacement.

U.S. Pat. No. 4,182,609 discloses a protective refractory member having clips and wire mesh pre-cast within the refractory member halves. The clips engage openings in the wire mesh to secure opposing halves to one another. There is no mechanism for positively interlocking the clips in the mesh. Opposing halves may thus work free from one another and fall from the support element.

A third and similar means for interengaging refractory segments is shown in U.S. Pat. No. 4,429,721. Again, this arrangement has no locking mechanism.

Finally, it has become common in the art to tack weld opposing strap ends to one another to protect against working free. Alternatively, others in the art have welded lock rods at appropriate locations on the strap ends, which are bent on-site by installment personnel, to capture one strap end on another. Each of these alternatives requires an additional installation and removal step, which is undesirable from the standpoint of labor and down time.

Therefore, it is an object of the present invention to provide a mechanism for interlocking refractory members which automatically prevents opposing members from working free due to normal stresses, strains and vibrations within the heating furnace. It is also an object to simplify installation and retrofit of refractory insulation to minimize the expense and labor associated with heating furnace down time. It is a further object to provide a device for locking refractory insulation members which requires no welding, or similar added step, at the point of installation, and which is also relatively easy to unlock for repair or replacement.

SUMMARY OF THE INVENTION

Accordingly, I have invented a locking device for refractory insulation members on support elements in a heat treating furnace, wherein each member is secured on a support element by at least one strap. The device includes a first strap end having a ramp and a second strap end having a raised bearing tab. The ramp engages the bearing tab with an interference-fit, and either the ramp or the tab, or both, is deflectable. Means for capturing the first strap end on the second strap end lock the insulation on the support element.

In a first embodiment of the invention, the ramp defines a hook having a bearing edge and the raised tab includes a window. The hook is insertable within the window, and the ramp deflects to provide clearance between the hook and the tab. After the hook is passed through the window, the bearing edge engages the tab to lock the first strap end to the second strap end. The first embodiment is particularly suitable for, but not limited to, locking semi-circular refractory insulation members on circular pipes.

In a second embodiment, the ramp is defined by an angled edge on the first strap end, which also includes a slot with a slot opening and a notch spaced from the slot. The second strap end includes an opposing slot with a slot opening and a raised tab spaced from the slot. The angled edge engages the raised tab with an interference-fit when the slots are interengaged, with the tab deflecting for clearance. The tab is received in the notch on the first strap end to lock the first strap end to the second strap end. The second embodiment is particularly suitable for, but not limited to, locking angled refractory members on angular, water cooled support elements.

Other features and advantages of the invention will become apparent from the following detailed description, in conjunction with the accompanying drawings.

DETAILED DESCRIPTION OF THE PREFERRED EMBODIMENTS

Figure 1:
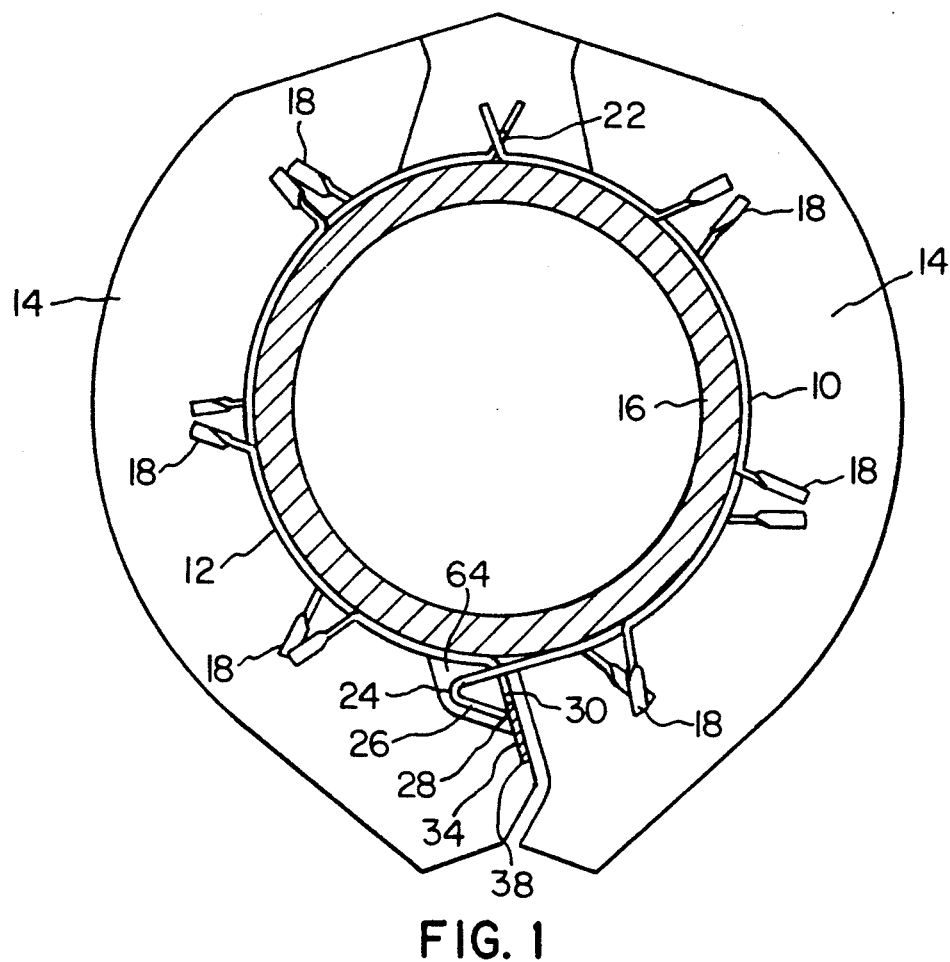
FIG. 1 is a sectional view showing a first embodiment of the invention.
Figure 2:
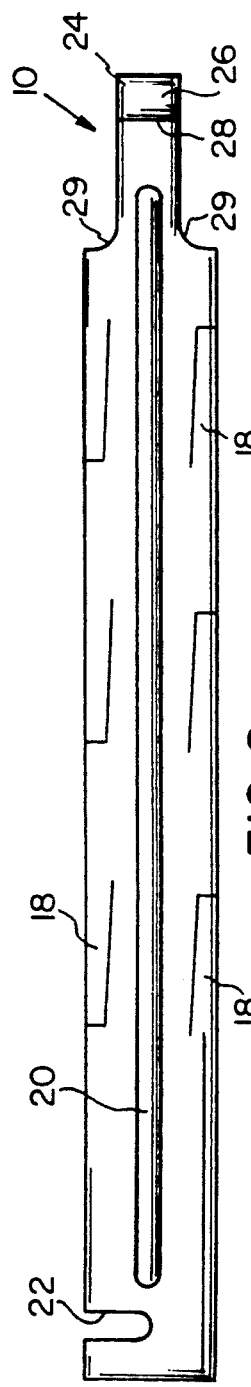
FIG. 2 is plan view of a first strap according to the first embodiment of the invention.
Figure 3:
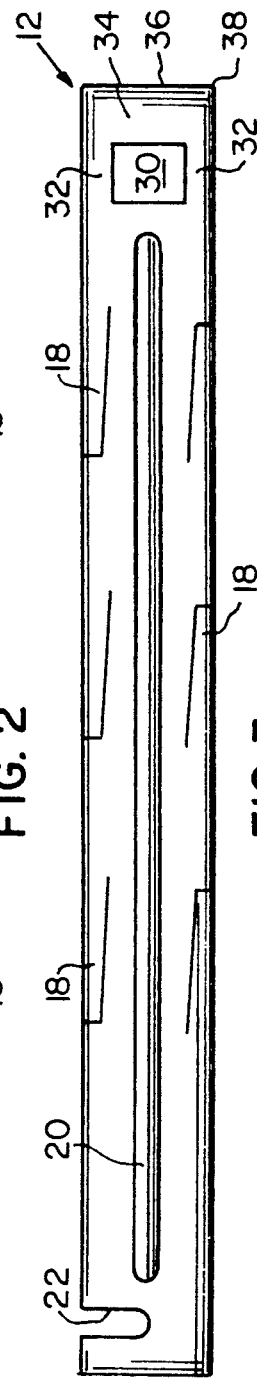
FIG. 3 is a plan view of a second strap according to the first embodiment of the invention.

FIGS. 1–3 show a pair of straps 10, 12 for locking refractory members 14 on a water cooled pipe 16 in a heat treating furnace. Each strap 10, 12 is integrally cast with its associated refractory member 14. The straps include a plurality of punched and twisted anchors 18 to aid in bonding the refractory member 14 to the strap. Each strap 10, 12 also includes at least one embossed rib 20 to add structural rigidity to the strap.

The first strap 10 includes a slot 22 on one end of the strap with a hook 24 on an opposite end. The hook includes a ramp 26 having a bearing edge 28, and the ramp is deflectable, as discussed below. The strap 10 also includes a pair of notches 29 on either side of hook 24.

The second strap 12 has a slot 22 on one end with a rectangular, central window 30 on an opposite end. The second strap 12 also includes punched and twisted anchors 18 and an embossed rib 20, similar to first strap 10. The end opposite slot 22 has a pair of lateral portions 32 on either side of window 30 With a lock surface 34 between window 30 and edge 36 of the strap. In use, the lateral portions 32 and lock surface 34 are bent with respect to a remainder of the second strap 12 to define a raised bearing tab 38, as shown in FIG. 1. Note that FIGS. 2 and 3 show straps 10 and 12 prior to bending the straps and twisting the anchors 18.

In operation, opposing slots 22 are first interengaged and their respective refractory members 14 are opened "clam shell style", i.e., with a hinged connection defined by opposing slots 22, and positioned above pipe 16. When in place, the refractory members 14 are allowed to close with a snap fit to secure the refractory members on the pipe. Particularly, the hook 24 is inserted in window 30 and engages the bearing tab 38 with an interference-fit. Ramp 26 deflects to provide clearance between the hook and the tab. Once the hook 24 has been pushed completely through the window 30, the ramp 26 returns to its original position, and bearing edge 28 engages lock surface 34 to lock the first strap 10 to the second strap. Additionally, the notches 29 on either side of hook 24 receive lateral portions 32 so that the straps 10, 12 are properly aligned and stably mounted around pipe 16. Thus, the first strap is locked to the second strap with no further welding or manipulation required.

FIGS. 4–7 show a second embodiment of the invention wherein straps 40, 42 and 44 are integrally cast or pressed with hook shaped refractory members 46 for insulating angular support element 48, known in the trade as "Therm-A-Rail". As with the first embodiment, straps 40, 42, 44 also include punched and twisted anchors 18' and embossed ribs 20'. The first strap 40 has a ramped end 50 including an angled edge 52 which extends between a slot 53 having a slot opening 54 and a notched back 56 opposite slot opening 54. A squared end 60 opposite ramped end 50 includes an opposing slot 58 and a raised bearing tab 62 aligned with the opening 54 of slot 58.

Figure 4:
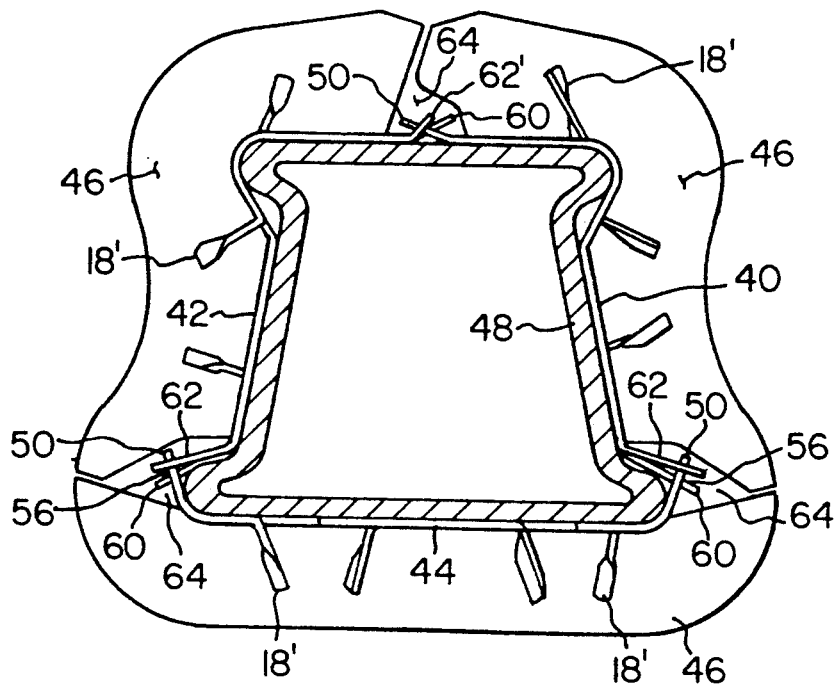
FIG. 4 is a sectional view showing a second embodiment of the invention.

The second strap 42 has two squared ends 60, neither having a notched back as in strap 40. Raised bearing tabs 62, 62' are aligned with slot openings 54, and slots 58 are both oriented in the same direction. Bearing tab 62' does not fully extend across slot opening 54 since the angle of inclination of its associated end 60 is relatively small, as shown in FIG. 4. By minimizing the profile of tab 62', a recess 64 in which the strap ends are received can be as small as possible. This insures that the support element 48 is fully insulated.

Figure 5:
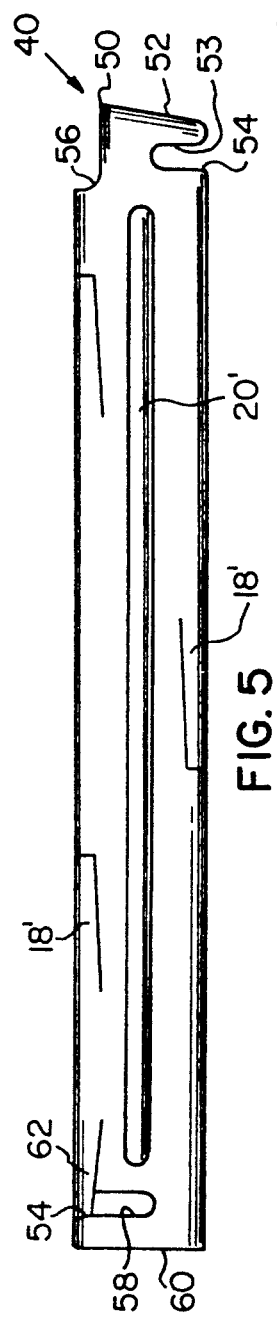
FIG. 5 is a plan view showing a first strap according to the second embodiment of the invention.
Figure 6:
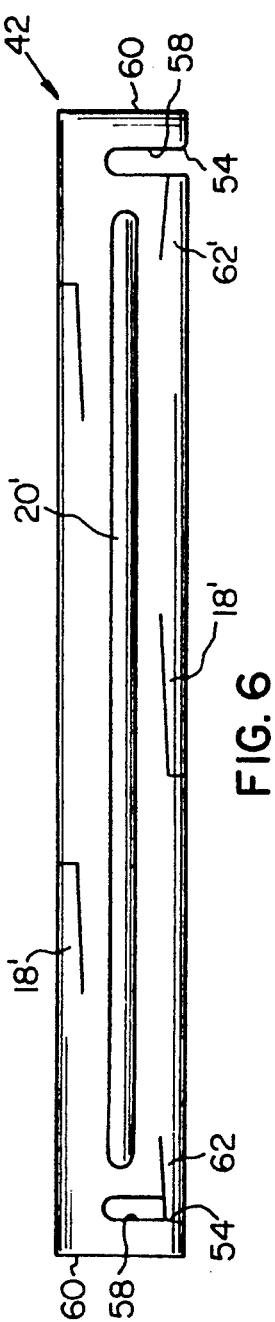
FIG. 6 is a plan view showing a second strap in accordance with the second embodiment of the invention.
Figure 7:
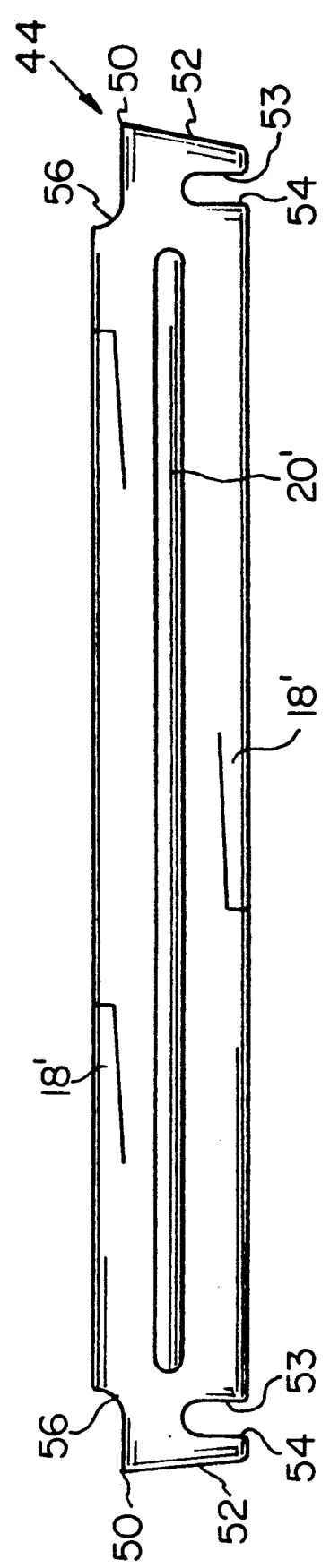
FIG. 7 is plan view showing a third strap in accordance with the second embodiment of the invention.
Figure 9:
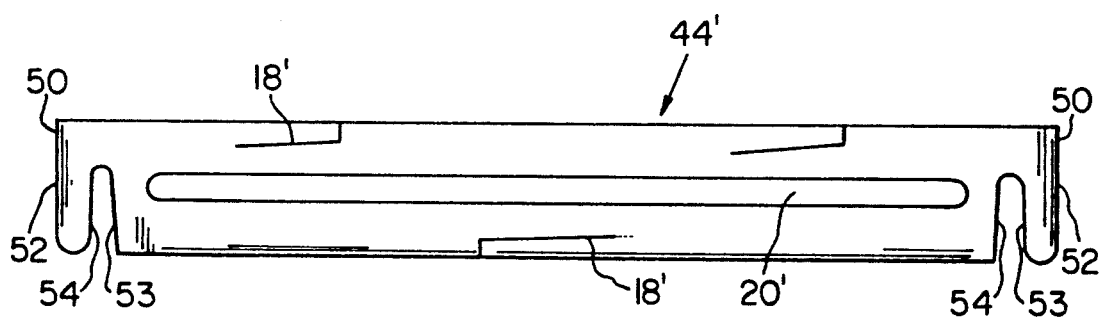
FIG. 9 is a plan view of an alternative to the strap of FIG. 7.

The third strap 44 includes angled edges 52 on each end 50 of the strap, as well as notched backs 56. Slots 53 are both oriented in the same direction. As above, FIGS. 5, 6 and 7 show straps 40, 42, 44 prior to bending, as shown in FIG. 4. FIG. 9 shows an alternative strap 44', excluding the notched backs 56. It has been found in certain applications that this design allows slots 53, 58 to engage prior to deflection of tabs 62. This facilitates proper alignment of the refractory pieces. It is necessary to cut slots 53 deeper in strap 44' for proper application of this design so that strap ends 50 can be captured by tabs 62.

In operation, strap ends 50, 60 associated with the first and second straps 40, 42 are first joined at the top of support element 48 and allowed to hang in place thereon. Particularly, tab 62' captures notched back 56 on strap 42. Next, the refractory member 46 associated with the third strap 44 is brought into place and ramped ends 50 are aligned with squared ends 60 on straps 40 and 42. The angled edges 52 then engage raised bearing tabs 62 when the slots 53 are intermeshed with opposing slots 58 on the first and second straps. The angled edges 52 engage the bearing tabs with an interference-fit, and the bearing tabs are deflectable for clearance between the two. When the slots 53 and 58 are fully engaged, the ramped ends 50 pass beyond bearing tabs 62, and the bearing tabs return to their original position, being received in the notched backs 56 on the ramped ends 50. The ramped ends are thereby captured in the squared ends of the first and second straps 40, 42 and all three refractory members 46 are thus locked on the support element 48.

Figure 8:
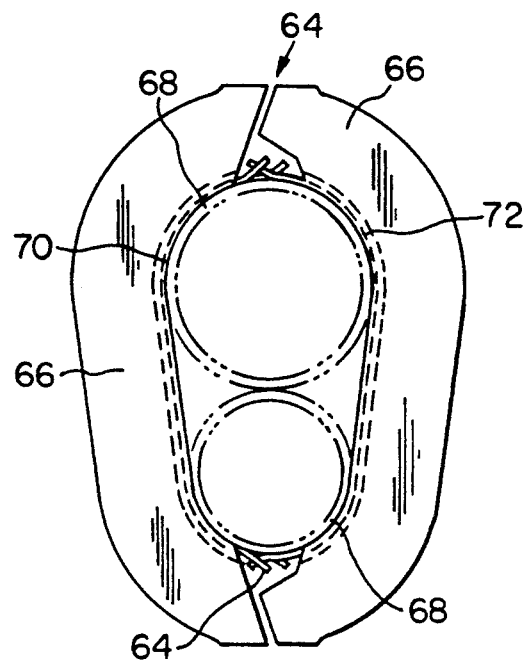
FIG. 8 is a sectional view showing an alternative application of the second embodiment of the invention.

FIG. 8 shows the second embodiment of the invention utilized to secure two refractory members 66 to tandem pipes 68. Two straps 70, 72 are utilized. Strap 70 has a configuration similar to strap 42, shown in FIG. 6, while strap 72 is similar to strap 44 in FIG. 7

In both embodiments of the invention, recesses 64 in refractory members 14, 46, 66 provide clearance for the locking mechanisms. It is preferable that the bearing tabs 38, 62 require considerable force in order to deflect them a minimal distance. This insures that the locking mechanisms are secured tightly around their respective support elements 16, 48. For example, straps made from 16 gauge, 309 or 310 stainless steel have been found suitable for this purpose. All the parts described above may be punched from a single stainless steel strap, with no welding required. Nor is any welding or bending required on site to install the straps of the present invention. Bending of raised tabs 38 and 62 on site may be required to loosen the straps for removal of the refractory members.

Having described the presently preferred embodiments of the invention, it will be understood that it is not intended to limit the invention except within the scope of the following claims.

I claim:

1. In a device for engaging refractory insulation members on support elements using at least two straps in a heat treating furnace, the improvement comprising a locking device for said straps, said locking device comprising:

a first strap end having a hook with a deflectable ramp and a bearing edge on a first strap;

a second strap end having a raised bearing tab with a central window, a lock surface adjacent said central window and two lateral portions, one on each side of said central window on a second strap;

said first strap having a slotted end opposite said first strap end and said second strap having an opposing slotted end opposite said second strap end, said slotted end engaging said opposing slotted end to define a hinged connection between said first strap and said second strap;

said hook insertable in said window, said ramp deflecting for clearance between said hook and said tab, said bearing edge engaging said lock surface after said hook is passed through said window to capture said first strap end on said second strap end and interlock said first strap with said second strap;

said first strap end having two notches, one on each side of said hook, for receiving the lateral portions of said raised tab.

2. The device of claim 1 wherein each of said first strap and said second strap is anchored to its respective insulation member.

3. The device of claim 1 wherein each of said first strap and said second strap is adjacent the support element on which it is installed.

4. In a device for engaging refractory insulation members on support elements using at least two straps in a heat treating furnace, the improvement comprising a locking device for said straps, said locking device comprising:

a first strap end having a slot with a slot opening, a notch spaced from said slot, and an angled edge extending between said slot opening and said notch on a first strap;

a second strap end having an opposing slot with a slot opening and a deflectable raised tab spaced from said slot on a second strap;

said angled edge engaging said raised tab with an interference-fit when said slots are interengaged, said tab deflecting for clearance between said edge and said tab;

said tab received in said notch to capture said first strap end on said second strap end and interlock said first strap with said second strap.

5. The device of claim 4 wherein the raised tab is aligned with the slot opening in said second strap end and the notch is opposite the slot opening in said first strap end.

6. The device of claim 4 wherein said first strap has a slotted end opposite said first strap end and said second strap has an opposing slotted end opposite said second strap end, said slotted end interengaging said opposing slotted end.

7. The device of claim 4 wherein each of said first strap and said second strap is anchored to its respective insulation member.

8. The device of claim 4 wherein each of said first strap and said second strap is adjacent the support element on which it is installed.

9. In a device for engaging refractory insulation members on support elements using at least two straps in a heat treating furnace, the improvement comprising a locking device for said straps, said locking device comprising:

a first strap end having a slot with a slot opening and an angled edge on a first strap;

a second strap end having an opposing slot with a slot opening and a raised tab deflectable by said angled edge, said tab spaced from said slot on a second strap;

said slots sufficiently deep to define means for interengaging said strap ends prior to deflection of said tab by said angled edge;

said tab defining means for capturing said first strap end on said second strap end after said slots are interengaged to interlock said first strap with said second strap.

10. The device of claim 9 wherein each of said first strap and said second strap is anchored to its respective insulation member.

11. The device of claim 9 wherein each of said first strap and said second strap is adjacent the support element on which it is installed.

12. The device of claim 9 further including a notch spaced from said slot on said first strap, said tab received in said notch to capture said first strap end on said second strap end and interlock said first strap with said second strap.

* * * * *